(No Model.)
J. ZIMMERMAN.
MEAT MIXER.
No. 420,291. Patented Jan. 28, 1890.
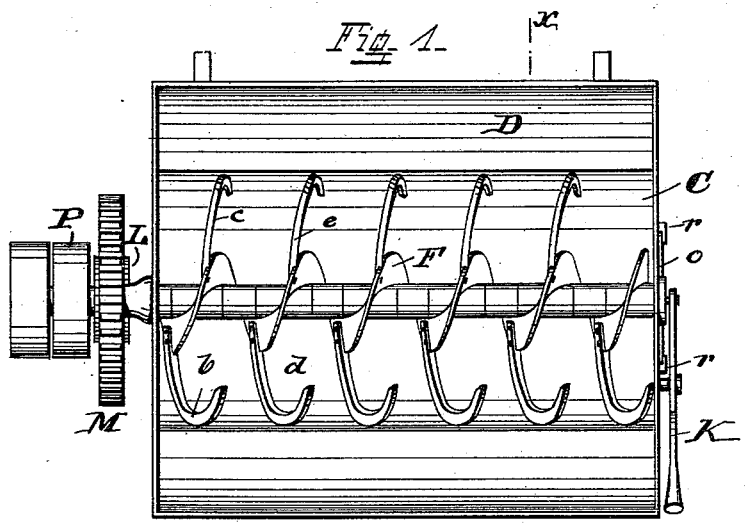
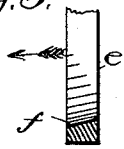
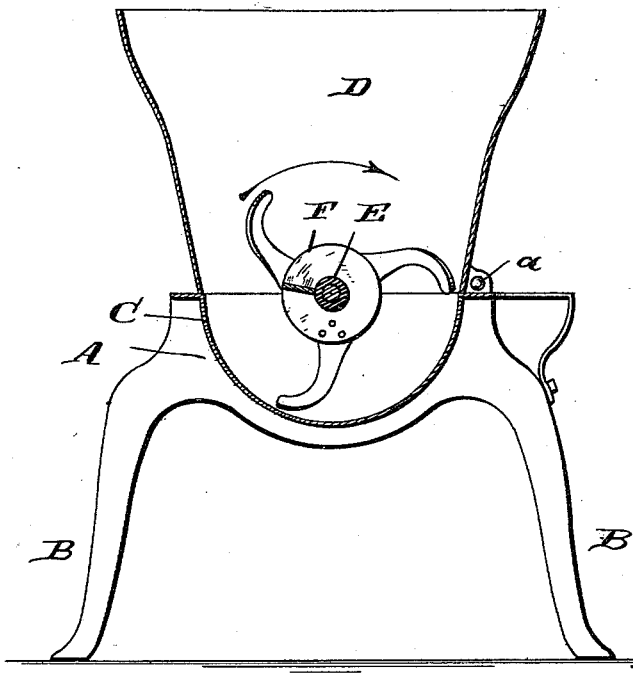
Attest
G. W. Figner
Alfred M. Allen
Inventor
John Zimmerman
by
Atty.

UNITED STATES PATENT OFFICE.

JOHN ZIMMERMAN, OF CINCINNATI, OHIO.

MEAT-MIXER.

SPECIFICATION forming part of Letters Patent No. 420,291, dated January 28, 1890.

Application filed July 1, 1889. Serial No. 316,209. (No model.)

*To all whom it may concern:*

Be it known that I, JOHN ZIMMERMAN, a citizen of the United States, residing at Cincinnati, in the county of Hamilton and State of Ohio, have invented a certain new and useful Improvement in Meat-Mixers, of which the following is a full, clear, and exact description, reference being had to the accompanying drawings, forming part of this specification.

My invention relates to improvements in machines for mixing minced meat, in which the meat is stirred by means of arms affixed to a rapidly-revolving central shaft.

In the accompanying drawings, Figure 1 is a top plan view of my improved mixer. Fig. 2 is a cross-section of the same, taken on the line $x\ x$ in Fig. 1. Fig. 3 is a cross-section of one of the stirrer-arms, showing its beveled inner face.

In mixing minced meat for sausages and the like it is extremely desirable that the mass of meat shall be thoroughly stirred and worked, so that the different parts of the meat and the spices and seasoning used shall be evenly distributed throughout and the whole mass rendered light and spongy.

With certain kinds of meat the addition of water, to be thoroughly incorporated and absorbed by the mass, is found to add very much to the lightness and palatability of the minced meat; and in order to obtain the best results the fibers of the meat must be disintegrated by extremely rapid and thorough stirring of the mass, and when this is the case the meat will absorb from thirty-five to fifty per cent. of water and its lightness and elasticity be very much improved thereby. It is also extremely desirable that the discharge of the meat from the machine may be very rapid, in order that the mass of meat may all be mixed in a like degree. With mixers as hitherto made the discharge of the meat is so slow that the meat which remains last in the machine is mixed much more thoroughly than that first discharged, and as a result the whole mass is not homogeneous and of a like consistency.

The object of my invention is to accomplish these results by means better adapted to that end than those hitherto used.

In the drawings, A is a cast-iron frame of suitable shape, supported by the legs B. In this frame a semi-cylindrical trough C is supported or cast integral therewith, and above this trough is fixed the hopper D, which is hinged to one side of the frame at $a$, so that the hopper may be swung out of the way when it is desired to get at the working parts for cleaning or repair. Journaled in each end of the trough C is the shaft E. The gear-wheel M, attached to this shaft, is operated by the band-pulley P, upon the band-shaft of which is the pinion L, which meshes with the gear-wheel M. Cast with this shaft E, or affixed thereto, is the spiral or screw conveyer F, and affixed to this spiral conveyer, or cast solid with it at equal intervals, are the curved stirrer-arms $b\ c\ d\ e$, &c., bent and curved so that they are in the same plane with the conveyer. The ends of these arms extend out from the conveyer and are so curved as to come in very close proximity to the interval surface of the trough, so that no portion of the minced meat can get beyond the action of the arms. The screw or conveyer is preferably made in sections and fitted on the shaft E, one or more arms being fixed to each section, and these sections can be so adjusted that the arms will be arranged spirally or in straight lines with reference to each other. As shown in the drawings, the arms are arranged in straight lines. At the end of the trough C is a gateway or opening closed by the gate O, which slides in the guides $r\ r$ and is operated by the hand-lever K.

The minced meat is fed down into the machine by gravity from the top of the hopper, which is made large to receive a large quantity of meat. The center of the mass after it passes the stirrers, meeting the sides of the rapidly-revolving conveyer, is quickly carried in a constant stream to the upper end of the trough, where, coming in contact with the end of the trough and hopper, it is forced up to and over the top of the mass by the meat following, and thence gradually back to the other end of the trough, where it comes again within the action of the stirrers and conveyer. The balance of the meat, coming in contact with the stirrers, besides being thoroughly stirred and worked up, is also carried by the curved conformation of the arms to the upper end of the machine in a constant stream, although not nearly so rapid in its flow as the conveyer-stream, and this portion is also forced up and back to the starting-point by the pressure of the meat following. Each of these stirrer-arms is cut away or beveled on its inner side, so that its face is inclined at an angle to the plane of revolution of the arm, as shown in Fig. 3 at $f$, and in this way, when the stirrer-arms revolve, the beveled faces of the arms strike the meat at an angle, and thus push it forward in the direction of the arrow in Fig. 3. In this way there are a number of different currents in the mass, and every portion of the meat is again and again brought within the action of the arms and conveyer, and the sodden mass as it comes from the meat-cutter is thoroughly mixed and lightened, and the water added when required is completely absorbed by the disintegrated fibers of the meat. When the minced meat is thus thoroughly mixed, the gate O is opened and the meat rapidly discharged by the conveyer and arms out of the receptacle.

Having thus fully described my invention, what I claim, and desire to secure by Letters Patent, is—

1. In a meat-mixer, a series of sections making a complete conveyer or screw, from the periphery of each section of which extends an arm or arms, the inner front side of each arm being beveled, substantially as and for the purpose described.

2. In a meat-mixer, the combination, with a spiral flange forming a screw conveyer, of a series of radially-extending arms arranged on the periphery thereof to form stirrers, substantially as shown and described.

3. In a meat-mixer, the combination, with a meat-trough, of a shaft extending longitudinally through the same, a spiral flange arranged therein to form a screw conveyer, and a series of radially-extending arms rigidly attached to the periphery thereof, said arms being curved to conform to the pitch of said screw, substantially in the manner and for the purpose described.

4. In a meat-mixer, the combination, with a semi-cylindrical mixing-trough, of a spiral conveyer adapted to rotate therein and having stirrer-arms attached to the periphery thereof, said stirrer-arms having their front sides beveled and being arranged on said conveyer to conform with the pitch of the spiral conveyer, substantially as shown and described.

5. In a meat-mixer, the combination, with a semi-cylindrical mixing-trough, of a shaft extending longitudinally through the same, said shaft carrying a screw conveyer with spirally-arranged stirrer-arms attached to the periphery thereof, and a hinged hopper closed at both ends and provided with a gate for the discharge of the meat at its upper end, substantially as shown and described.

JOHN ZIMMERMAN.

Witnesses:
ALFRED M. ALLEN,
CHARLES W. FIGURE.